United States Patent [19]
Janik et al.

[11] Patent Number: 6,019,890
[45] Date of Patent: Feb. 1, 2000

[54] FUEL FILTER WITH HAND PRIMER

[75] Inventors: Leon P. Janik, Suffield; Michael J. Williams, Glastonbury; Larry R. Cote, Coventry, all of Conn.

[73] Assignee: Stanadyne Automotive Corp., Windsor, Conn.

[21] Appl. No.: 08/889,831

[22] Filed: Jul. 10, 1997

[51] Int. Cl.⁷ .................................................. B01D 35/26
[52] U.S. Cl. ...................... 210/117; 210/136; 210/416.4; 210/444; 417/313
[58] Field of Search .............................. 210/416.1, 416.4, 210/136, 438, 117, 416.3, 416.5, 444; 417/313, 437, 571

[56] References Cited

U.S. PATENT DOCUMENTS

| | | | |
|---|---|---|---|
| 2,905,097 | 9/1959 | Johnson | 417/571 |
| 4,515,690 | 5/1985 | Yasuhara | 210/416.4 |
| 5,207,898 | 5/1993 | Hodgkins | 210/416.4 |
| 5,578,221 | 11/1996 | Janik . | |

*Primary Examiner*—Matthew O. Savage
*Attorney, Agent, or Firm*—Alix, Yale & Ristas, LLP

[57] ABSTRACT

A fuel filter assembly employs a hand primer and a disposable filter cartridge mounted to a header. The filter cartridge has a filter element which defines an interior chamber for receiving the filtered fuel. The hand primer includes a diaphragm which cooperates with the header to define a reservoir and a valve plate having a plurality of orifices and an axial opening for providing fluid communication between an exit passage of the header and the reservoir and between the chamber and the reservoir, respectively. A first check valve is mounted in the opening and a second check valve is mounted in an axial bore in the first check valve. The first and second check valves are moveable between an open position for allowing flow through the orifices of the valve plate and orifices in the first check valve, respectively, and a closed position for preventing such flow. The filter assembly is primed by pushing the diaphragm downwards, creating a high pressure which moves the first check valve to the open position and the second check valve to the closed position, causing trapped air to be expelled through the orifices and the exit passage. Removing the downwards force allows a spring to return to bias the diaphragm upwards, creating a low pressure which moves the first check valve to the closed position and the second check valve to the open position, and drawing fuel from the interior chamber.

11 Claims, 7 Drawing Sheets

FUEL FILTER WITH HAND PRIMER

BACKGROUND OF THE INVENTION

The present invention generally relates to enhancements in devices for filtering and separating liquids. More particularly, the present invention relates to fuel filters for removing foreign particles and separating water from fuel of a fuel supply system associated with an internal combustion engine.

Diesel fuel supplies frequently contain significant quantities of abrasive particles and water which present the potential for permanent damage to the components of the fuel injection pump and the fuel delivery system of the engine. Consequently, an effective fuel filter assembly is a practical necessity and is conventionally incorporated into the fuel supply system of a diesel engine. A multitude of conventional fuel filter assemblies employ a disposable filter cartridge which is replaced at pre-established intervals of filter usage. Such filter cartridges typically perform the dual function of removing particulate material from the diesel fuel and separating water from the fuel.

The fuel filter assemblies to which the present invention relates include a replaceable filter cartridge and a header with a base which accepts the disposable filter cartridge. The filter cartridge has a housing which defines an axial opening at one end thereof to provide fuel communication between the fuel delivery system and a filter element disposed within the cartridge housing. A sealing grommet is disposed at the axial opening to provide a fluid-tight seal. The fuel filter cartridges may house a single stage filter or a dual stage filter and may assume a wide variety of shapes and configurations.

Conventional headers used with such fuel filter assemblies include a fuel entry port which is in fluid communication with a central axial fuel conduit for transporting fuel to be filtered into the filter cartridge. Additionally, a fuel exit port of the header is fluidly connected to a coaxial fuel conduit disposed about the central fuel conduit and cooperating therewith to define a fuel exit passage therebetween. Thus, fuel to be filtered conventionally enters the filter cartridge via the central fuel conduit, is filtered therein and then exits the filter cartridge via the exit fuel passage which surrounds the central fuel conduit.

In such conventional fuel filter assemblies, a manual primer mechanism is often provided to facilitate engine starting after a spent fuel cartridge has been replaced with a fresh one. In particular, this fuel primer mechanism is disposed in the fuel flow path between the fuel entry port and the central fuel conduit such that actuation of the manual primer pump draws fuel from the connected fuel supply and forces it into the filter cartridge. While such designs can effectively prime the filter cartridge, they suffer from the deficiency that the fuel passing through the primer mechanism has not yet been filtered by the filter cartridge. Thus, any contaminated fuel passing therethrough can deposit particulate matter on the manual primer mechanism. These particles accumulate over time and interfere with proper performance of the primer mechanism. Naturally, this problem becomes more acute as the field life of the fuel filter assembly increases. Failure of the fuel filter assembly may be the result of this situation. This deficiency is particularly acute in fuel filter assemblies used on heavy construction equipment, such as bulldozers and cranes, due to the severe environmental conditions in which such equipment normally operates.

It has been discovered that the above-described deficiency could be alleviated by reconfiguring the fuel filter assembly so that the manual primer pump is located downstream of the filter cartridge. Since, with such an arrangement, the fuel passing through the primer mechanism has already passed through the filter cartridge, very few, if any, contaminants have an opportunity to accumulate in the primer mechanism. The above-described deficiencies of conventional fuel filter assemblies can, thus, conceivably be overcome by replacing all such filter assemblies with newly redesigned devices. Such a solution is, however, highly impractical unless it could be accomplished in an efficient and cost effective manner.

Accordingly, there is a need in the art for improved fuel filter assemblies and methods therefor in which fuel entering the fuel filter assembly is filtered substantially immediately upon entry into the fuel filter assembly. There is a further need in the art for inexpensive fuel filter assemblies and methods therefor to retrofit conventional fuel supply systems with improved fuel filter assemblies.

SUMMARY OF THE INVENTION

Briefly stated, the invention is an improved hand primer for use with a header of a conventional fuel filter assembly and a reverse flow fuel filter cartridge. The fuel filter cartridge includes a filter element defining an interior chamber for receiving fuel that has traversed the filter element and has had particles and/or water removed thereby. The header has an exit port and a conduit that provides fluid communication between the exit port and the interior chamber of the filter element. The hand primer includes a diaphragm that cooperates with the header to define a reservoir which is disposed intermediate the conduit and the exit port. A valve plate is disposed intermediate the reservoir and the header. The valve plate has a plurality of orifices and a single axial opening. The orifices provide fluid communication between the exit port and the reservoir and the opening provides fluid communication between the conduit and the reservoir. A spring engages the diaphragm and the valve plate to bias the diaphragm away from the valve plate. The hand primer also includes first and second check valves that are moveable between open and closed positions to selectively prevent flow through the orifices and the axial opening, respectively.

The filter assembly is primed by pushing the diaphragm downwards, compressing the spring and creating a high pressure within the reservoir. The high pressure moves the first check valve to the open position and the second check valve to the closed position, causing trapped air to be expelled through the orifices and the exit port.

Removing the downwards force allows the spring to return to its normal length, forcing the diaphragm upwards and creating a low pressure. The low pressure moves the first check valve to the closed position and the second check valve to the open position, providing a driving head which causes fuel to flow from the interior chamber to the reservoir.

The reverse flow configuration of the filter cartridge provides effective filtration of fuel passing through a conventional header in a direction which is opposite to the normal direction of fuel flow through the header. Therefore, the reverse flow filter cartridge protects the hand primer mechanism by ensuring that the fuel passing through the fuel filter assembly is filtered prior to passing by the hand primer mechanism.

It is accordingly an object of the present invention to provide an improved hand primer for use with fuel filter assemblies in which fuel entering the fuel assembly is routed to the filter enclosed within the filter cartridge prior to communication with the hand primer mounted to the filter assembly header.

Other objects and advantages of the invention will become apparent from the drawings and specification.

BRIEF DESCRIPTION OF THE DRAWINGS

The present invention may be better understood and its numerous objects and advantages will become apparent to those skilled in the art by reference to the accompanying drawings in which.

DESCRIPTION OF THE PREFERRED EMBODIMENTS

With reference to the drawings wherein like numerals represent like parts throughout the several figures, a hand primer in accordance with the present invention is generally designated by the numeral 10. The inventive hand primer 10 depicted therein incorporates the present invention into an embodiment designed for use with a diesel engine. However, it will also be appreciated that the instant invention can be incorporated into a wide variety of other styles of known fluid filters for use in a wide range of environments and with other fluids.

Figure 2:
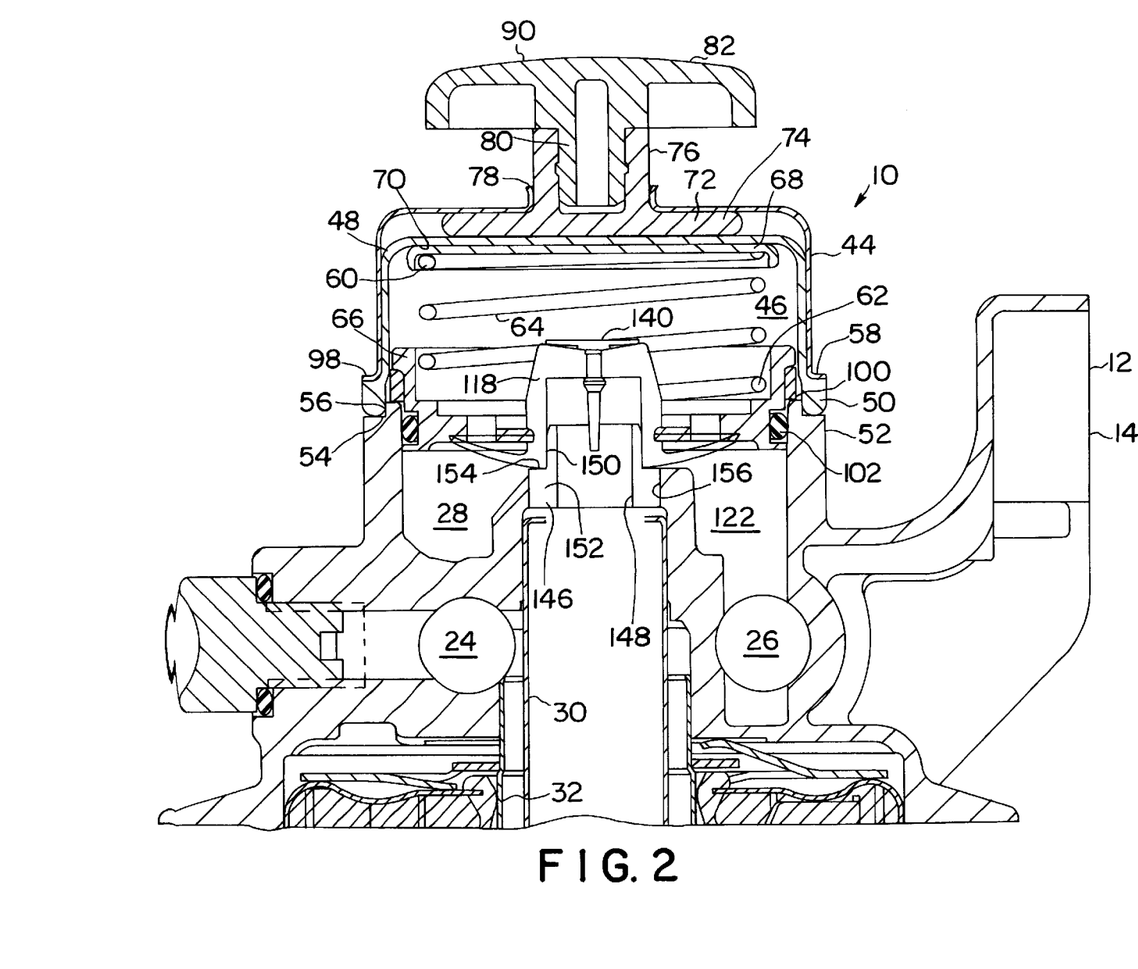
FIG. 2 is an enlarged sectional elevation view of the hand primer, filter base and upper portion of the filter cartridge of FIG. 1.

With reference to FIG. 2, a hand primer 10 in accordance with the present invention can be mounted to a base 12 of a header 14 via a first retaining collar 16 and a fuel filter cartridge 18 can be mounted to the base 12 via a second retaining collar 20 to form an improved fuel filter assembly 22. The header 14 comprises a body which defines a fuel exit port 24, a fuel entry port 26, base 12 and a sump 28. Additionally, the header 14 includes a first central fuel conduit 30 defining an axis 31, which is in fluid communication with the sump 28 and fuel entry port 26, and a second fuel conduit 32 which is in fluid communication with fuel exit port 24. When header 14 is operated in the conventional manner, the fuel entry port 26 acts as a fuel entry passage and the fuel exit port 24 acts as a fuel exit passage. Thus, fuel to be filtered by the fuel assembly conventionally enters the header 14 via the fuel entry port 26, flows through the sump 28 and enters the filter cartridge 18 via the first conduit 30. After filtration occurs, the filtered fuel enters the passage formed between the first and second conduits 30, 32 and then exits the fuel assembly 22 via the fuel exit port 24. The cartridge 18 is disposable and is replaced upon sufficient degradation of its filter qualities.

While the filter cartridge 18 of the present invention is used with conventional header, the header 14 is operated in a reverse manner relative to the normal operation thereof. In particular, when the header 14 is used in conjunction with the present invention, fuel exit port 24 serves as a fuel entry passage and fuel entry port 26 serves as a fuel exit passage. Consequently, the second conduit 32 acts as a fuel entry conduit and the first conduit 30 acts as a fuel exit conduit.

Figure 1:
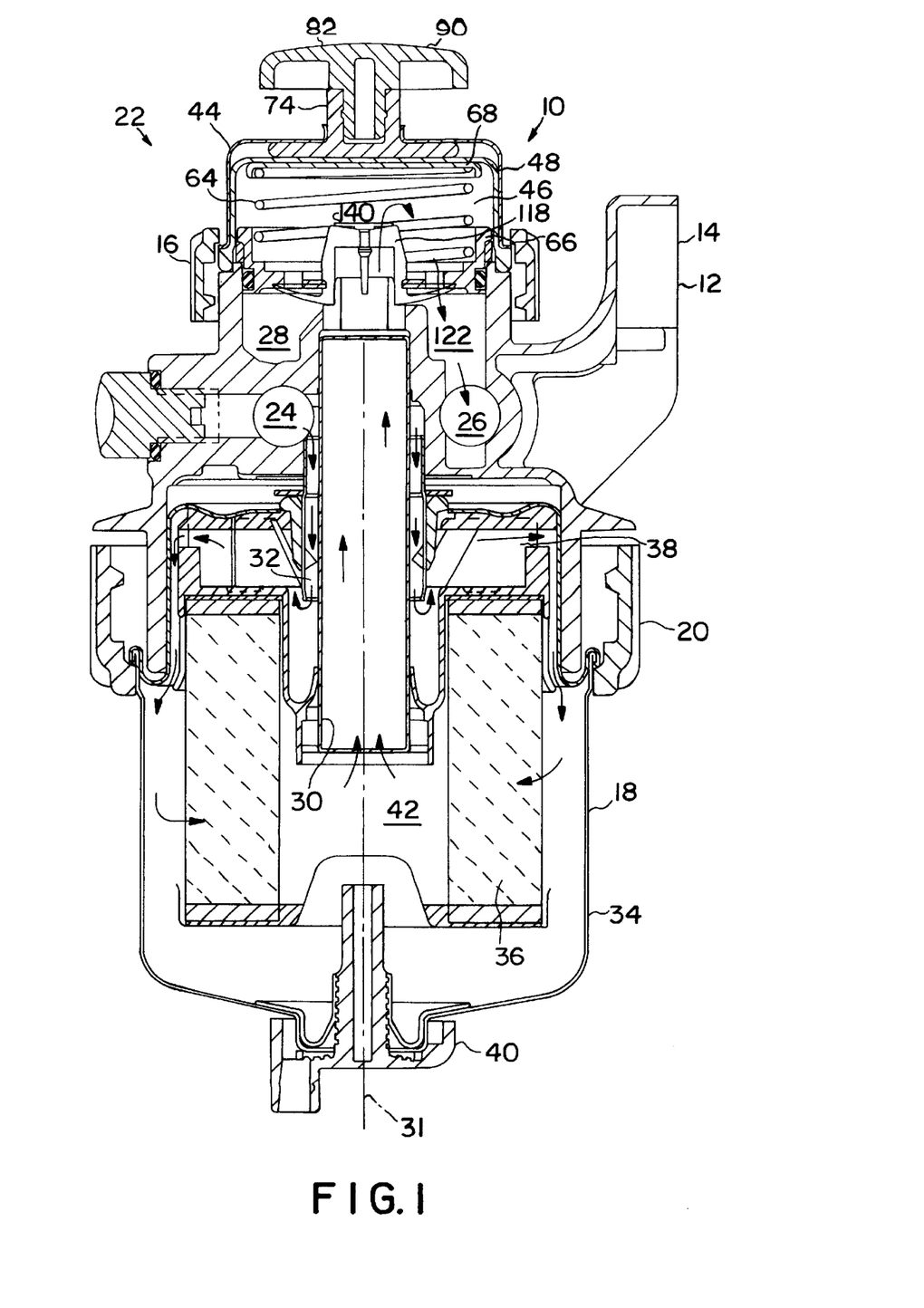
FIG. 1 is a sectional elevation view of a filter assembly employing a hand primer in accordance with a first embodiment of the present invention.

As shown in FIG. 1, the filter cartridge 18 includes a housing 34, a filter element 36, a flow-reversing insert 38, and a water drain mechanism 40. A first end wall of the housing 34 defines an opening having a grommet seal disposed thereon for sealingly engaging the exterior of the second conduit 32 when cartridge 18 and header 14 are engaged with one another. At an opposite end of the housing, a second end wall defines an opening for receiving a water drain mechanism 40 as is known in the art. The filter is a conventional filter element 36 of a continuous fan-shaped, pleated configuration. Thus, as fuel flows through the filter element 36, particulate matter and water suspended in the fuel are removed therefrom.

The housing 34, the insert 38, and the filter element 36 cooperate to define a flow path for the fuel. As shown by the arrows in FIG. 1, fuel delivered to the header 14 arrives at the exit port 24 (passage serves as a fuel entry passage rather than a conventional fuel exit passage). This fuel flows in an axial direction through the passage defined between the first and second conduits 30, 32. The fuel flow is then directed upward and outward by the insert 38 to the space between the filter element 36 and the side-wall of the housing 34. The fuel then flows radially inward through the filter element 36 and into the sump 28 via the interior chamber 42 defined by the filter element 36. Finally, the fuel flows into the fuel entry port 26 and exits the header 14 (i.e., fuel entry port acts as the fuel exit passage).

Figure 5:
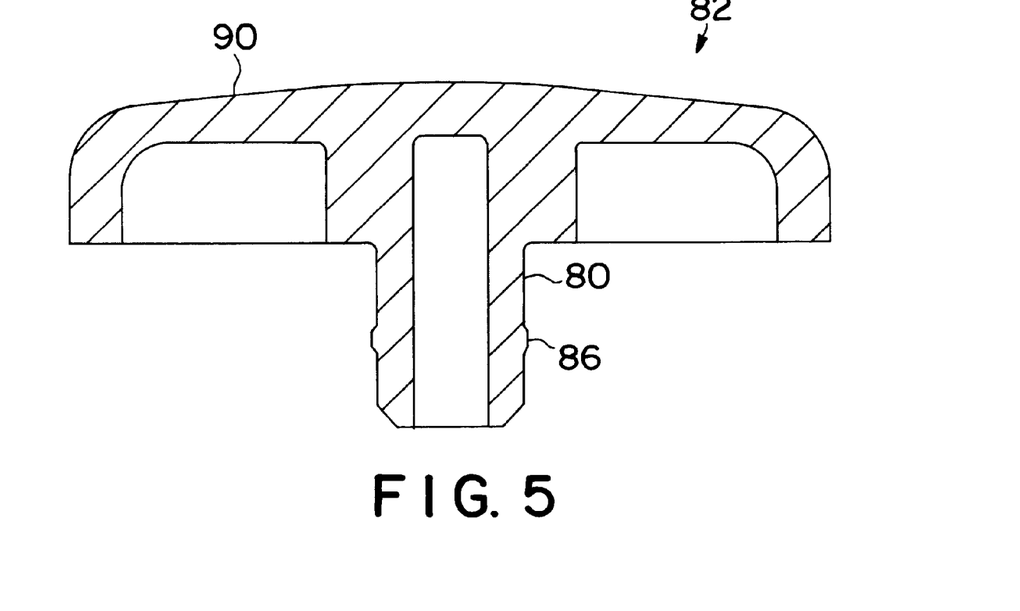
FIG. 5 is an enlarged cross-sectional view of the hand primer knob of FIG. 2.
Figure 6:
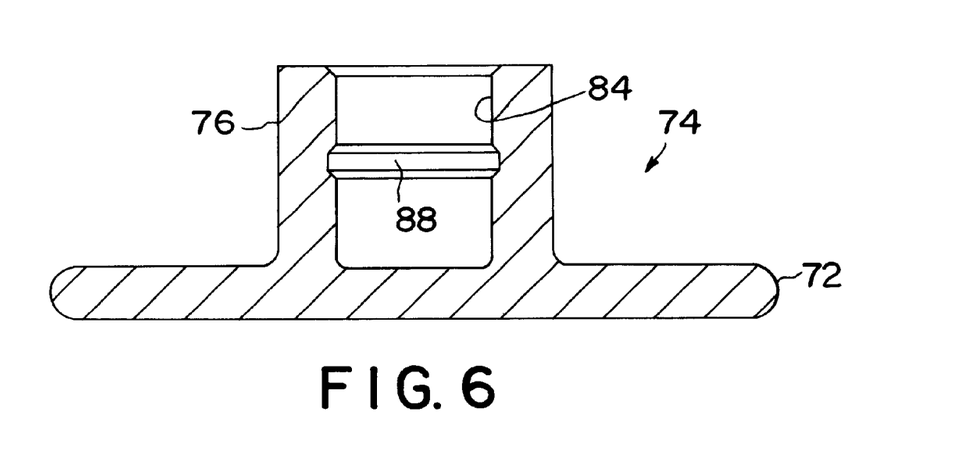
FIG. 6 is an enlarged sectional view of the hand primer plunger of FIG. 2.

As shown in FIGS. 1 and 2, the hand primer 10 includes a housing 44 that is mounted to the filter base 12. The housing 44 and the sump 28 cooperate to define a reservoir 46. A diaphragm 48 is disposed within the housing 44 and includes a radially extending skirt 50 that is clamped between the housing 44 and the rim 52 of the header base 12 to seal the hand primer 10 to the base 12. A shelf 54 defined by an upwardly projecting portion 56 of the rim 52 and a radially flaring lower lip 58 on the housing 44 increases the surface contact area between the diaphragm 48, the housing 44 and the base 12. Further, the outwardly flaring lip 58 prevents the housing 44 from cutting into the skirt 50 of the diaphragm 48. Preferably, the diaphragm 48 is composed of a flexible, inert material, such as nitrile, fluorocarbon or fluorosilicon. The upper and lower ends 60, 62 of a spring 64, which is also disposed within the diaphragm 48, engage the lower surface of the diaphragm 48 and the upper surface of the valve plate 66, respectively, to bias the diaphragm 48 away from the valve plate 66. A spring cap 68 may be disposed intermediate the upper end 60 of the spring 64 and the lower surface 70 of the diaphragm 48 to distribute the biasing force over the lower surface of the diaphragm 48. The base 72 of a plunger 74 is disposed intermediate the upper surface of the diaphragm 48 and the end wall of the housing 44. The shaft 76 of the plunger 74 extends upwardly through an opening 78 in the end wall of the housing 44 and is free to move reciprocally up and down within the opening 78. With additional reference to FIGS. 5 and 6, the stem 80 of a hand-knob 82 is mounted within a blind bore 84 in the shaft 76 of the plunger 74 by a circumferential protrusion 86 that is received within a groove 88 in the blind bore 84. The operator pad 90 of the hand-knob 82 may be depressed to compress the diaphragm 48 against the biasing force of the spring 64.

Figure 3:
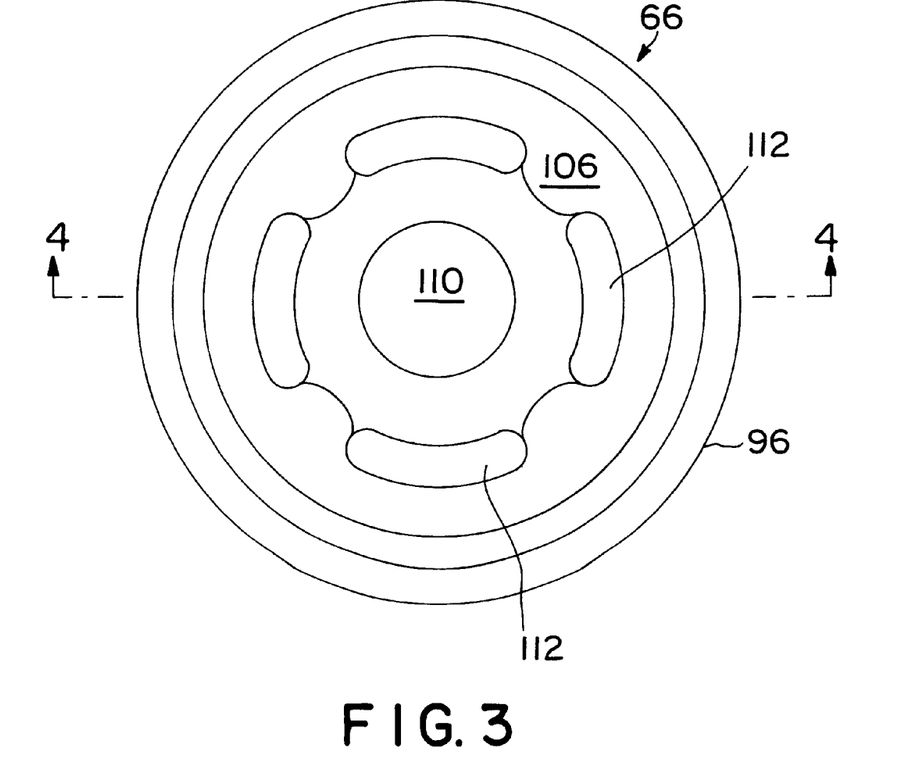
FIG. 3 is an enlarged top view the valve plate of FIG. 2.
Figure 4:
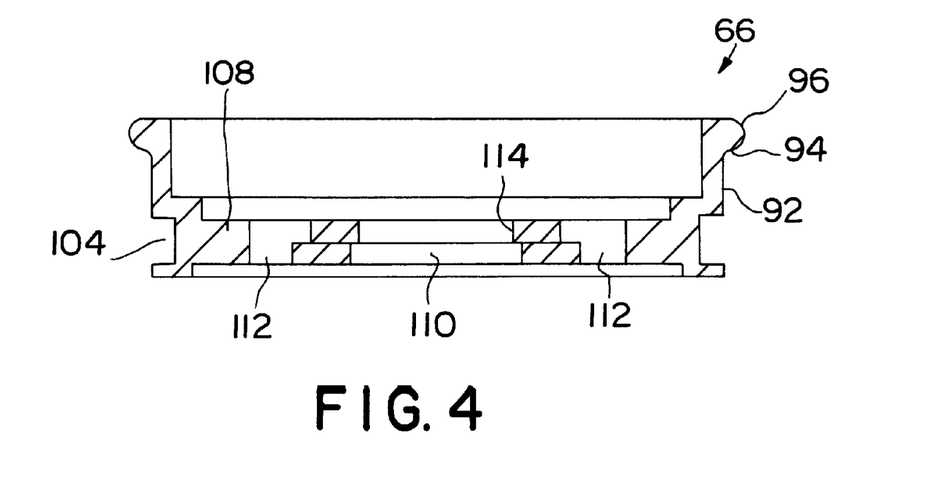
FIG. 4 is a sectional view of the valve plate of FIG. 3 taken along the line 4—4 thereof.

The valve plate 66 provides a means of directing the flow of fuel into and out of the reservoir 46. With reference to FIGS. 2, 3 and 4, a cylindrical portion 92 of the valve plate 66 is received within the upwardly extending rim 52 of the base 12. A shoulder 94 defined by a radially extending lip 96 on the valve plate 66 engages a spacer 98 which rests on the upper surface 100 of the upwardly projecting portion 56 of the rim 52. An O-ring 102 mounted in a circumferential groove 104 on the cylindrical portion 92 of the valve plate 66 engages the inside surface of the rim 52 to seal the valve plate 66 to the base 12. An inwardly extending flange 106 on the valve plate 66 has an upper surface 108 that is engaged by the spring 64. The biasing force exerted by the spring 64 helps hold the valve plate 66 in place. The flange 106 defines an opening 110 and a plurality of radially spaced orifices 112. The opening 110 in the flange 106 is substantially coaxial with the first and second conduits 30, 32 of the base 12. The inner edge 114 of the flange 106 is received in a circumferential groove 116 on the primer valve 118 to mount and seal the primer valve 118 to the valve plate 66. A radially extending seating member 120 of the primer valve 118 is moveable between upper and lower positions such that the seating member 120 closes each of the orifices 112 when it is in the upper position and the orifices 112 provide fluid communication between the reservoir 46 and the outlet plenum 122 when the seating member 120 is in the lower position.

Figure 7:
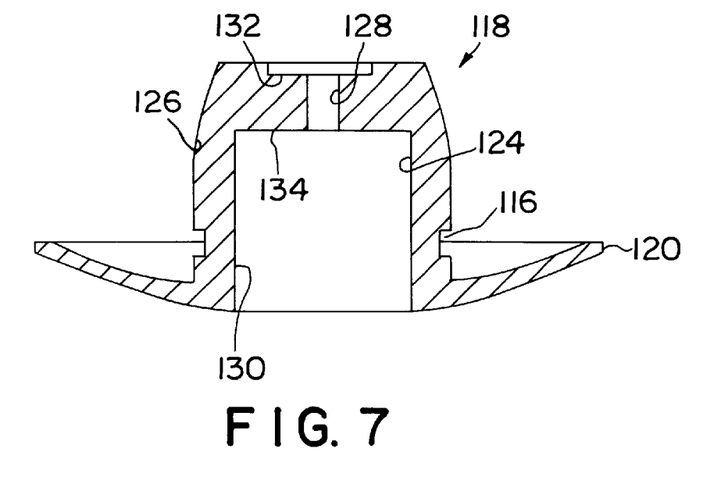
FIG. 7 is an enlarged sectional view of the primer valve of FIG. 2.
Figure 8:
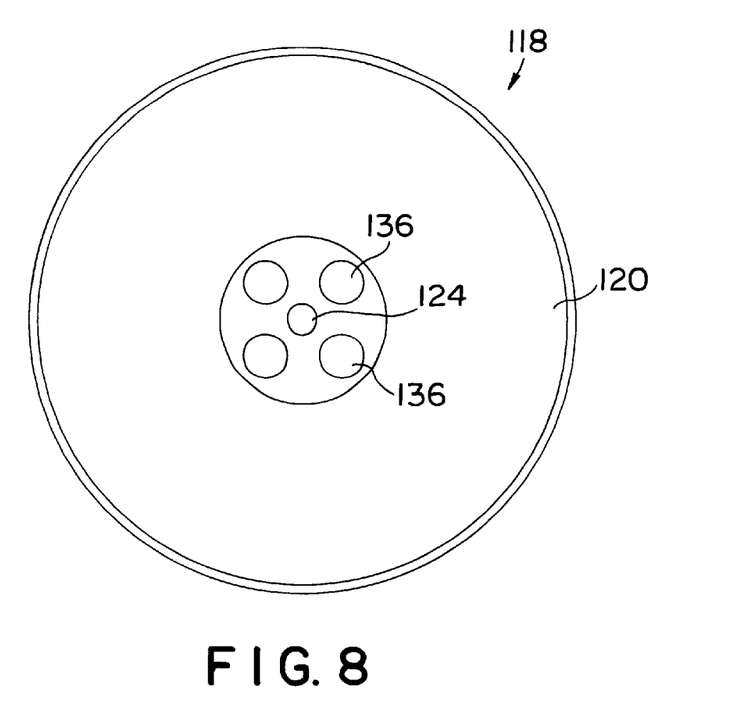
FIG. 8 is a bottom view of the primer valve of FIG. 7.
Figure 9:
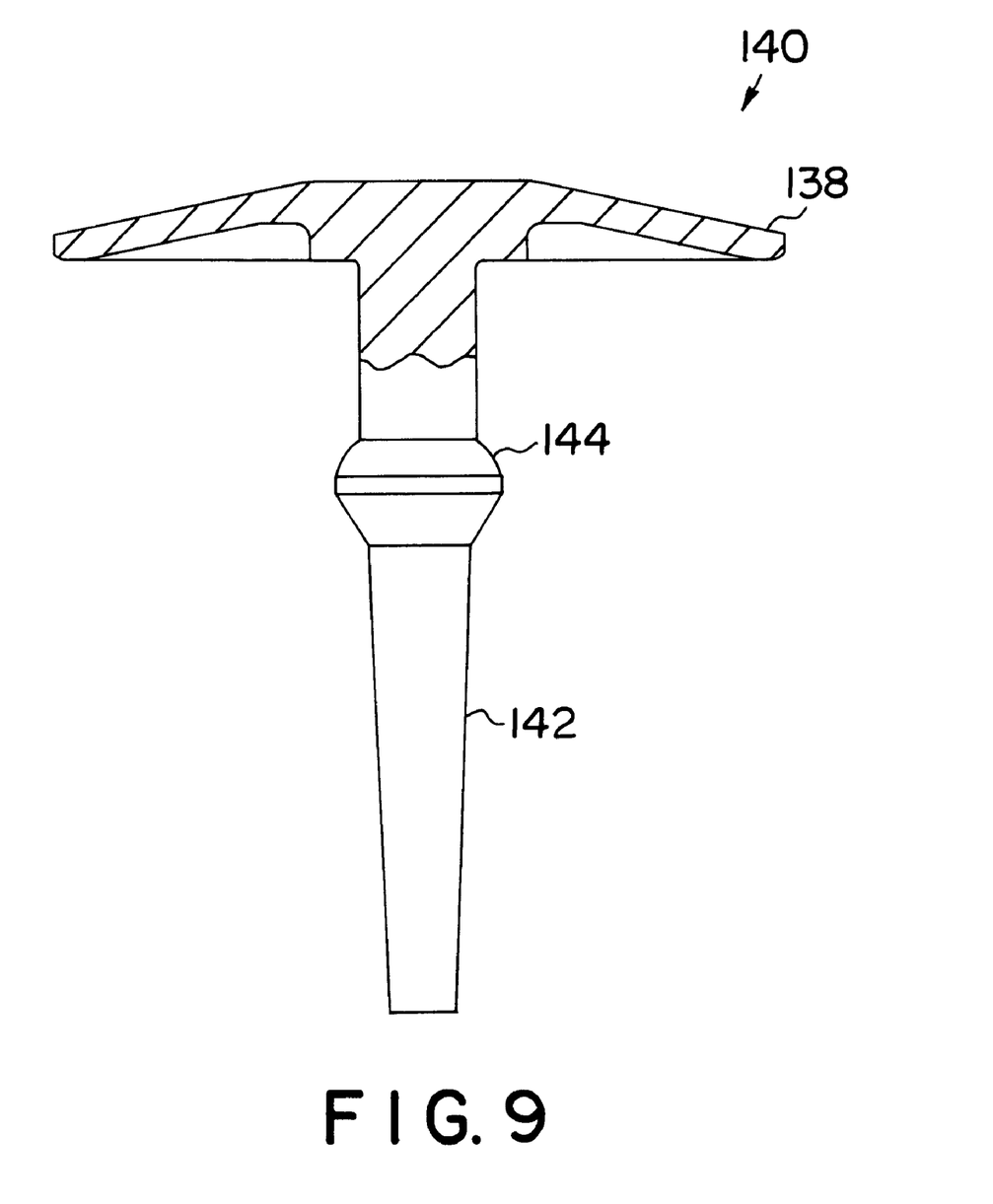
FIG. 9 is an enlarged sectional view, partly broken away, of the umbrella valve of FIG. 2.

Preferably, the primer valve 118 is composed of a flexible, inert material, such as nitrile, fluorocarbon or fluorosilicon. With reference to FIGS. 7 and 8, a stepped bore 124 extends axially through the body 126 of the primer valve 118. The inside diameter of the upper portion 128 of the bore 124 is smaller than the inside diameter of the lower portion 130 of the bore 124 to define upper and lower shoulders 132, 134. A plurality of radially spaced orifices 136 extend between the upper surface of the primer valve 118 and the lower portion 130 of the bore 124. The radially extending seating member 138 of an umbrella valve 140 has an outside diameter that is greater than the inside diameter of the upper portion 128 of the bore 124. The stem 142 of the umbrella valve 140 extends into the bore 124 such that the umbrella valve 140 is moveable between upper and lower positions. When the umbrella valve 140 is in the lower position, the seating member 138 extends over the orifices 136 and engages the upper shoulder 132, preventing flow through each of the orifices 136. The orifices 136 are uncovered and provide fluid communication between the reservoir 46 and the lower portion 130 of the bore 124 when the umbrella valve 140 is in the upper position. A radially extending protrusion 144 on the stem 142 is positioned in the lower portion 130 of the bore 124. The outside diameter of the protrusion 144 is greater than the inside diameter of the upper portion 128 of the bore 124 to capture the stem 142 in the bore 124.

With reference to FIG. 2, a seal 146 is mounted in the base 12 intermediate the end of the first conduit 30 and the primer valve 118. The seal 146 is preferably composed of polymeric material, for example nylon, and defines an axial bore 148 for the passage of fuel. The seal 146 includes upper and lower portions 150, 152, the lower portion 152 having an outside diameter which is greater than the outside diameter of the upper portion 150 to define a shoulder 154. The upper portion 150 of the seal 146 is received within the lower portion 130 of the stepped bore 124 of the primer valve 118 and the seating member 120 of the primer valve 118 engages shoulder 154 to seal the seal 146 to the primer valve 118. The lower portion 152 of the seal 146 is received within an opening 156 in the base 12 to seal and mount the seal 146 to the base 12.

The fuel filter assembly 22 is primed by depressing the hand-knob 82, plunger 74, and diaphragm 48 against the biasing force of the spring 64. The pressure created by depressing the diaphragm 48 pushes the seating member 138 of the umbrella valve 140 into the lower position, closing the orifices 136 in the primer valve 118. The pressure also pushes the seating member 120 of the primer valve 118 into the lower position, opening the orifices 112 in the valve plate 66 and propelling fuel and any air trapped in the fuel filter assembly 22 from the reservoir 46 out of the fuel filter assembly 22 via the outlet plenum 122 and entry port 26. Releasing the hand-knob 82 allows the spring 64 to return the diaphragm 48 to its fully extended position, creating a suction in the reservoir 46. The suction will draw the seating members 120, 138 of the primer valve 118 and the umbrella valve 140 to the upper positions, closing the orifices 112 in the valve plate 66 and opening the orifices 136 in the primer valve 118, respectively. The suction draws fuel from chamber 42 into the reservoir 46 via the first conduit 30.

Figure 10:
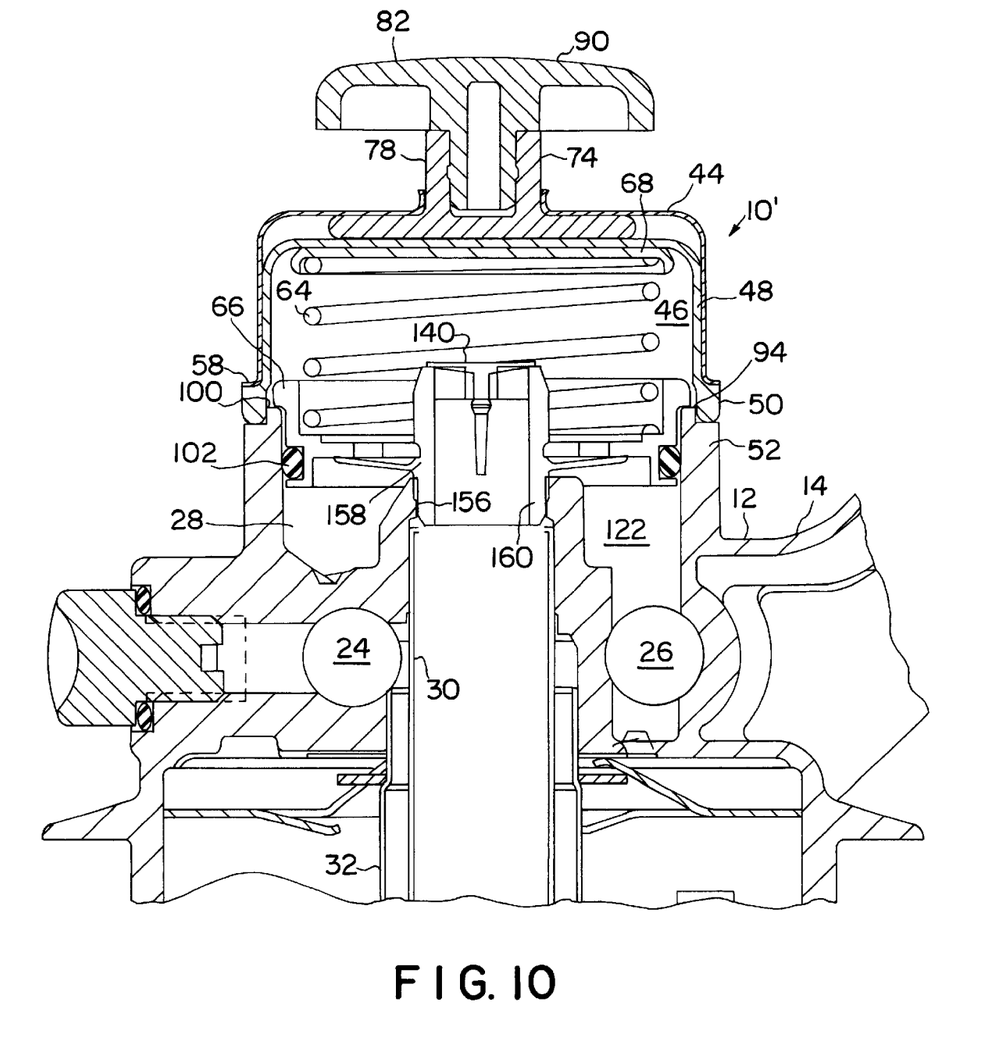
FIG. 10 is an enlarged sectional view of a filter base, the upper portion of a filter cartridge, and a hand primer in accordance with a second embodiment of the present invention.

A second embodiment 10' of the invention is depicted in FIG. 10. As indicated by the use of like reference numerals, the structure and operation of this embodiment is substantially similar to that described above with respect to the embodiment of FIG. 1 except that the hand primer 10' does not include a seal or a spacer. Therefore, a lower axial extension 158 of the primer valve 160 is received within the opening 156 of the base 12 to seal and mount the primer valve 160 to the base 12 and the shoulder 94 of the valve plate 66 engages the upper surface 100 of the rim 52.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A reverse-flow fuel filter assembly comprising:
 a fuel filter cartridge comprising a filter element defining an axial interior chamber for receiving fuel that has traversed said filter element;
 a header comprising a rim and having a fuel port defining a reverse-flow exit passage and an axial first passageway that provides fluid communication between said exit passage and said interior chamber; and
 a hand primer comprising
  diaphragm means cooperating with said header for defining a reservoir disposed intermediate said first passageway and said exit passage;
  flow director means disposed intermediate said reservoir and said header for directing the flow of fuel into and out of said reservoir, said flow director means defining orifice means for providing fluid communication between said exit passage and said reservoir and opening means for providing fluid communication between said first passageway and said reservoir, said flow director means comprising a cylindrical portion disposed within said rim, said cylindrical portion having an outer surface defining a circumferential groove, and seal means disposed within said groove, wherein said seal means engages said rim to seal said flow director means to said header, said flow director means comprising a radially extending lip defining a lower shoulder and said rim comprises an axially extending portion having an inner surface, wherein said lower shoulder of said flow director means engages said inner surface;

biasing means engaged with said diaphragm means and said flow director means for biasing said diaphragm means away from said flow director means;

first check valve means for preventing flow from said exit passage to said reservoir through said orifice means; and second check valve means for preventing flow from said reservoir to said interior chamber through said opening means.

2. The fuel filter assembly of claim 1 wherein said first check valve means comprises a body disposed in said opening means of said flow director means and a radially extending seating member, said body defining an axially extending bore and a orifice means for providing fluid communication between said reservoir and said first passageway, said seating member of said first check valve means being positionable to open or close said orifice means of said flow director means.

3. The fuel filter assembly of claim 2 wherein said header comprises an axial opening and said body comprises an axially extending portion which is received in said opening to seal said first check valve means to said header.

4. The fuel filter assembly of claim 2 wherein said header comprises an axial opening and said hand primer further comprises a sealing member having a primer mounting portion and a header mounting portion and defining an axially extending bore, wherein said primer mounting portion is disposed within said bore of said first check valve means and said header mounting portion is disposed within said axial opening to seal said first check valve means to said header.

5. The fuel filter assembly of claim 1 wherein said fuel filter cartridge further comprises a housing and said header further comprises a second fuel port and a second passageway, said housing of said fuel filter cartridge and said filter element defining a space, said second fuel port defining a reverse-flow fuel inlet passage, said second passageway providing fluid communication between said fuel inlet passage and said space.

6. A reverse-flow fuel filter assembly comprising:

a fuel filter cartridge comprising a filter element defining an interior chamber for receiving fuel that has traversed said filter element;

a header having a rim, a fuel port defining a reverse-flow exit passage and a first passageway that provides fluid communication between said exit passage and said interior chamber; and a hand primer comprising
a diaphragm cooperating with said header for defining a reservoir disposed intermediate said first passageway and said exit passage;
a flow director disposed intermediate said reservoir and said header for directing the flow of fuel into and out of said reservoir, said flow director defining at least one orifice for providing fluid communication between said exit passage and said reservoir and an opening for providing fluid communication between said first passageway and said reservoir, said flow director comprising a cylindrical portion disposed within said rim of said header, said cylindrical portion having an outer surface defining a circumferential groove;

a seat disposed within said groove, said seal engaging said rim of said header to seal said flow director to said header;

a biasing element engaged with said diaphragm and said flow director for biasing said diaphragm away from said flow director;

a first check valve for preventing flow from said exit passage to said reservoir through said orifice; and a second check valve for preventing flow from said reservoir to said interior chamber through said opening.

7. A reverse-flow fuel filter assembly comprising:

a fuel filter cartridge comprising a filter element defining an axial interior chamber for receiving fuel that has traversed said filter element;

a header comprising a rim and having a fuel port defining a reverse-flow exit passage and an axial first passageway that provides fluid communication between said exit passage and said interior chamber; and a hand primer comprising
diaphragm means cooperating with said header for defining a reservoir disposed intermediate said first passageway and said exit passage;
flow director means disposed intermediate said reservoir and said header for directing the flow of fuel into and out of said reservoir, said flow director means defining orifice means for providing fluid communication between said exit passage and said reservoir and opening means for providing fluid communication between said first passageway and said reservoir, said flow director means comprising a cylindrical portion disposed within said rim, said cylindrical portion having an outer surface defining a circumferential groove, and seal means disposed within said groove, wherein said seal means engages said rim to seal said flow director means to said header, said flow director means comprising an inwardly extending flange having a surface;
biasing means engaged with said diaphragm means and said surface of said flow director means for biasing said diaphragm means away from said flow director means;
first check valve means for preventing flow from said exit passage to said reservoir through said orifice means; and
second check valve means for preventing flow from said reservoir to said interior chamber through said opening means.

8. The fuel filter assembly of claim 7 wherein said flange defines said opening means and said orifice means.

9. A reverse-flow fuel filter assembly comprising:

a fuel filter cartridge comprising a filter element defining an axial interior chamber for receiving fuel that has traversed said filter element;

a header having a fuel port defining a reverse-flow exit passage and an axial first passageway that provides fluid communication between said exit passage and said interior chamber; and a hand primer comprising
diaphragm means cooperating with said header for defining a reservoir disposed intermediate said first passageway and said exit passage;
flow director means disposed intermediate said reservoir and said header for directing the flow of fuel into and out of said reservoir, said flow director means defining orifice means for providing fluid communication between said exit passage and said reservoir and opening means for providing fluid communication between said first passageway and said reservoir;

biasing means engaged with said diaphragm means and said flow director means for biasing said diaphragm means away from said flow director means;

first check valve means for preventing flow from said exit passage to said reservoir through said orifice means, said first check valve means comprising a body disposed in said opening means of said flow director means and a radially extending seating member, said body defining an axially extending bore and orifice means for providing fluid communication between said reservoir and said first passageway, said seating member of said first check valve means being positionable to open or close said orifice means of said flow director means; and second check valve means for preventing flow from said reservoir to said interior chamber through said opening means, said second check valve means comprising an umbrella valve having a stem disposed in said bore of said first check valve means.

10. The fuel filter assembly of claim 9 wherein said bore of said first check valve means has first and second portions, each of said portions having an inside diameter, said diameter of said second portion of said bore being greater than said diameter of said first portion of said bore, and said stem of said umbrella valve comprises a protrusion having an outside diameter which is greater than said diameter of said first portion of said bore and less than said diameter of said second portion of said bore.

11. The fuel filter assembly of claim 9 wherein said first check valve means further defines at least one orifice and said umbrella valve further has a radially extending seating member having an outside diameter, said outside diameter of said seating member of said umbrella valve being greater than said diameter of said first portion of said bore of said first check valve means, said umbrella valve being moveable between a first position wherein said seating member of said umbrella valve engages said first check valve means preventing flow through said orifice and a second position wherein said seating member of said umbrella valve is positioned axially from said first check valve means allowing flow through said orifice.

* * * * *

UNITED STATES PATENT AND TRADEMARK OFFICE
CERTIFICATE OF CORRECTION

PATENT NO. : 6,019,890  
DATED : February 1, 2000  
INVENTOR(S) : Janik et al.

It is certified that error appears in the above-identified patent and that said Letters Patent is hereby corrected as shown below:

Column 8,
Line 1, delete "seat" and insert -- seal --.

Signed and Sealed this

Twentieth Day of August, 2002

Attest:

Attesting Officer

JAMES E. ROGAN
Director of the United States Patent and Trademark Office